W. R. SHERMAN.
Peach Stoner.
No. 228,949.  Patented June 15, 1880.
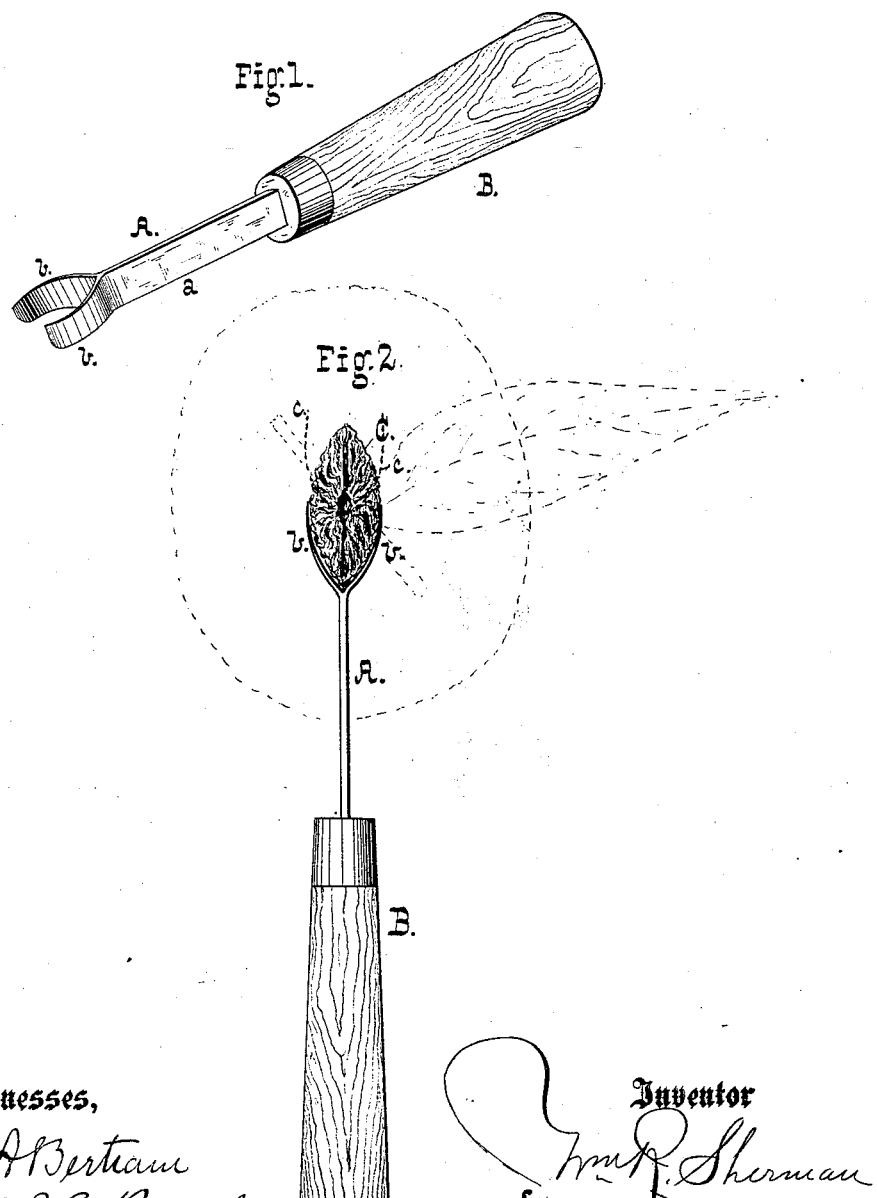

UNITED STATES PATENT OFFICE.

WILLIAM R. SHERMAN, OF BALTIMORE, MARYLAND.

PEACH-STONER.

SPECIFICATION forming part of Letters Patent No. 228,949, dated June 15, 1880.

Application filed September 18, 1879.

*To all whom it may concern:*

Be it known that I, WILLIAM R. SHERMAN, of the city of Baltimore, State of Maryland, have invented certain new and useful Improvements in Peach-Stoners; and I hereby declare the same to be fully, clearly, and exactly described as follows, reference being had to the accompanying drawings, in which—

Figure 1 is a perspective view of the device; Fig. 2, a plan view illustrating its mode of operation.

My invention has for its object to furnish an implement for extracting the stones from clingpeaches in a ready and expeditious manner and without any material waste of the body of the fruit.

Heretofore devices of this class have consisted, as a rule, of one or more curved knives, which were made to pass through the peach parallel to the axis of the stone, incidentally halving or quartering the fruit; but their use resulted practically in a waste of that portion of the peach opposite the ends of the stone, the devices operating substantially on the principle of an ordinary apple-corer. With the device about to be described the waste is practically confined to that portion of the fruit which lies in the interstices of the stone.

In the accompanying drawings, A is a blade having a sharpened edge, $a$, and terminating in curved blades $b\ b$, the whole being secured in a suitable handle, B.

The shape of the blades $b\ b$ is such that they are adapted to fit against the edge of the stone C, as shown in Fig. 2, and reach about halfway around it—that is to say, they are made to fit upon the larger-sized stones—and at a single cut to half sever the stone from the peach, cutting opposite the edges of the stone, instead of, as heretofore, opposite its sides.

The blades are made of spring-steel, so as to yield somewhat in cutting out very large stones.

In operation (the peach being first pared, if desired) the knife is made to cut into the peach opposite one of the apices of the stone, the blades $b\ b$ being made to cut, as shown in dotted lines $c\ c$, in such manner that when the knife touches the stone the apex of the latter will enter at the junction of the blades. The knife is then carried around the peach, the axis of the knife being maintained about in a line with the center of the stone, until the cut reaches its point of entrance.

It is obvious that the operation results in cleanly severing the stone from the peach while halving the latter.

A little practice enables one to become very expert in the use of the implement.

I am aware that it is not broadly new to provide a blade for halving the peach, with a V-shaped cutter for severing the stone, and such I do not claim.

What I claim is—

The peach-stoner herein described, consisting of the handle B and blade A, bifurcated, as described, at the end, to form supplemental curved blades $b\ b$, lying in the same plane with the blade A, as and for the purpose described.

WM. R. SHERMAN.

Witnesses:
R. D. WILLIAMS,
W. S. WILKINSON.